US011128588B2

(12) United States Patent
Ueno et al.

(10) Patent No.: US 11,128,588 B2
(45) Date of Patent: *Sep. 21, 2021

(54) APPARATUS, METHOD AND COMPUTER-READABLE RECORDING MEDIUM STORING COMPUTER PROGRAM FOR RESTRICTING ELECTRONIC FILE VIEWING UTILIZING ANTIVIRUS SOFTWARE

(71) Applicant: NOMURA RESEARCH INSTITUTE, LTD., Tokyo (JP)

(72) Inventors: Masahiro Ueno, Tokyo (JP); Tianfeng Ma, Tokyo (JP); Atsushi Ito, Tokyo (JP); Sumio Midorikawa, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,663

(22) Filed: Jun. 30, 2020

(65) Prior Publication Data
US 2020/0329001 A1   Oct. 15, 2020

Related U.S. Application Data

(63) Continuation of application No. 14/953,360, filed on Nov. 29, 2015, now Pat. No. 10,742,578, which is a
(Continued)

(51) Int. Cl.
G06F 15/16 (2006.01)
H04L 12/58 (2006.01)
(Continued)

(52) U.S. Cl.
CPC .............. H04L 51/12 (2013.01); G06F 21/56 (2013.01); G06Q 10/107 (2013.01); H04L 51/18 (2013.01); H04L 63/145 (2013.01)

(58) Field of Classification Search
CPC ....... H04L 51/12; H04L 51/18; H04L 63/145; H04L 51/34; G06Q 10/107; G06F 21/56; G06F 21/564
(Continued)

(56) References Cited

U.S. PATENT DOCUMENTS 8,819,823 B1 * 8/2014 Banerjee ............. H04L 63/1441
726/23
8,903,920 B1   12/2014 Hodgson
(Continued)

FOREIGN PATENT DOCUMENTS

JP   2000353133 A   12/2000
JP   2007515867 A    6/2007
(Continued)

OTHER PUBLICATIONS

U.S. Final Office Action for U.S. Appl. No. 14/953,360; dated, Jan. 30, 2019.
(Continued)

Primary Examiner — Johnny B Aguiar
(74) Attorney, Agent, or Firm — Rankin, Hill & Clark LLP

(57) ABSTRACT

A processor acquires feature information of a target email, among email that has already been transmitted from the information processing apparatus, the target email specified by an operation of a user of the information processing apparatus as email to be restricted from viewing-access by a user of a receiving-side apparatus. The processor transmits feature information of the target email to an apparatus that receives information for identifying a removal target for a security measure system. The target email is designated as a removal target by the security measure system for the receiving-side apparatus.

16 Claims, 4 Drawing Sheets

Related U.S. Application Data continuation of application No. PCT/JP2013/003889, filed on Jun. 21, 2013.

(51) Int. Cl.
  *G06F 21/56* (2013.01)
  *G06Q 10/10* (2012.01)
  *H04L 29/06* (2006.01)

(58) Field of Classification Search
  USPC .............................. 709/206, 224; 726/22, 24
  See application file for complete search history.

(56) References Cited

U.S. PATENT DOCUMENTS

| | | | |
|---|---|---|---|
| 9,014,343 B1* | 4/2015 | Peden ............... | H04M 3/53366 379/67.1 |
| 2002/0026360 A1 | 2/2002 | McGregor et al. | |
| 2005/0267937 A1* | 12/2005 | Daniels ................ | H04L 51/00 709/206 |
| 2008/0317228 A1* | 12/2008 | Kay ..................... | G06Q 30/014 379/201.01 |
| 2010/0023774 A1* | 1/2010 | Matsuzaki ........... | G06F 21/606 713/176 |
| 2010/0057869 A1 | 3/2010 | Stavrou et al. | |
| 2010/0250579 A1* | 9/2010 | Levow ................ | H04L 51/12 707/769 |
| 2011/0078247 A1* | 3/2011 | Jackson ............ | H04M 3/53366 709/206 |
| 2011/0131281 A1 | 6/2011 | Mishra et al. | |
| 2017/0091717 A1 | 3/2017 | Chandraghatgi et al. | |

FOREIGN PATENT DOCUMENTS

| | | |
|---|---|---|
| JP | 2008176377 A | 7/2008 |
| JP | 2008276580 A | 11/2008 |
| JP | 2011010093 A | 1/2011 |
| WO | 2006132371 A1 | 12/2006 |
| WO | 2014203296 A1 | 12/2014 |

OTHER PUBLICATIONS

IPRP from International Application No. PCT/JP203/003889 dated Dec. 22, 2015 and Written Opinion of the International Searching Authority; dated Jul. 16, 2013.
International Search Report for International Application No. PCT/JP2013/003889; dated Jul. 16, 2013.
JPO Patent Office Action on Patentability for JP Appln No. 2015-129962; dated Nov. 1, 2016.
JPOA on Patentability for JP Appln No. 2014-544289; dated Oct. 28, 2014.
JPOA on Patentability for JP Appln No. JP2014-544289; dated Mar. 31, 2015.
U.S. Non Final Office Action for U.S. Appl. No. 14/953,360; dated, Jul. 12, 2018.

* cited by examiner

APPARATUS, METHOD AND COMPUTER-READABLE RECORDING MEDIUM STORING COMPUTER PROGRAM FOR RESTRICTING ELECTRONIC FILE VIEWING UTILIZING ANTIVIRUS SOFTWARE

CROSS REFERENCE TO RELATED APPLICATIONS

The present application is a continuation application of U.S. patent application Ser. No. 14/953,360, filed on Nov. 29, 2015, the entire contents of which are incorporated herein by reference and priority to which is hereby claimed. Application Ser. No. 14/953,360 is a continuation of application No. PCT/JP2013/003889, filed Jun. 21, 2013. Priority under 35 U.S.C. § 119(a) and 35 U.S.C. § 365(b) is hereby claimed, the disclosures of which are both also incorporated herein by reference.

BACKGROUND OF THE INVENTION

1. Field of the Invention

The present invention relates to a data processing technology and, more particularly, to a technology for viewing restriction of electronic data.

2. Description of the Related Art

Email is a widely technology for transmitting information among a plurality of users. However, problems can occur due to erroneous transmission of email.

The following Patent Document No. 1 suggests a communication system that suppresses the opening of the text of a transmitted email at the destination of said transmitted email. More specifically, a relay apparatus that relays email is provided in the system, and the relay apparatus stores the text of the email in memory and allows receipt of the text of the email when a destination terminal requests to view the email. Further, the relay apparatus deletes the text of the email in the memory of the relay apparatus when such action is requested by a terminal.

[Patent Document No. 1] Japanese Patent Application Publication NO. 2011-10093

In the above Patent Document No. 1, it is necessary to store and accumulate the data of an already-transmitted email in a server (for example, a relay apparatus according to Patent Document No. 1) located within the jurisdiction of a transmitter organization from which the email is sent. In the technology according to Patent Document No. 1, an increase in the required amount of system resources of a server is expected when, for example, a large amount of email data is stored. The inventors of the present invention consider that there is room for improvement in order to efficiently restrict the receipt of an already-transmitted email to a destination terminal.

SUMMARY OF THE INVENTION

The present invention provides, in part, a technology for efficiently restricting access of the text of an already-transmitted email to a destination terminal.

An information processing apparatus according to one embodiment of the present invention includes: a processor, which is configured to: acquire feature information of a target email, among email that has already been transmitted from the information processing apparatus, the target email specified by an operation of a user of the information processing apparatus as email to be restricted from viewing-access by a user of a receiving-side apparatus; and transmit feature information of the target email to an apparatus that receives information for identifying a removal target for a security measure system, wherein the target email is designated as a removal target by the security measure system for the receiving-side apparatus.

Another embodiment of the present invention relates to an information processing apparatus. This apparatus includes: a registration request receiver, which is on a computer terminal that receives a request for registering feature information of a target email, among email that has already been transmitted from a transmitting-side apparatus, the target email specified by an operation of a user of the transmitting-side apparatus as email to be viewing-access restricted from a user of a receiving-side apparatus; and a feature information provider that processes and provides feature information of the target email to an apparatus or an unit that generates a definition file of a security measure system, so to detect the target email as a removal target by the security measure system for the receiving-side apparatus.

Still another embodiment of the present invention relates to a method of viewing-access restricting email. This method includes: acquiring, by a processor, feature information of a target email, among email that has already been transmitted from a transmitting-side apparatus, the target email specified by an operation of a user of the transmitting-side apparatus as email to be restricted from viewing-access by a user of a receiving-side apparatus; and transmitting, by the processor, feature information of the target email to an apparatus that receives information for identifying a removal target for a security measure system.

Still another embodiment of the present invention relates to a method of restricting viewing access. This method includes: receiving a request for registering feature information of a target email, among email that has already been transmitted from a transmitting-side apparatus, the target email specified by an operation of a user of the transmitting-side apparatus as email to be viewing-access restricted from a user of a receiving-side apparatus; and providing feature information of the target email to an apparatus or an unit that generates a definition file of a security measure system, so to detect the target email as a removal target by the security measure system for the receiving-side apparatus.

Optional combinations of the aforementioned constituent elements, or implementations of the invention in the form of methods, systems, programs, and recording mediums storing programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

Figure 1:
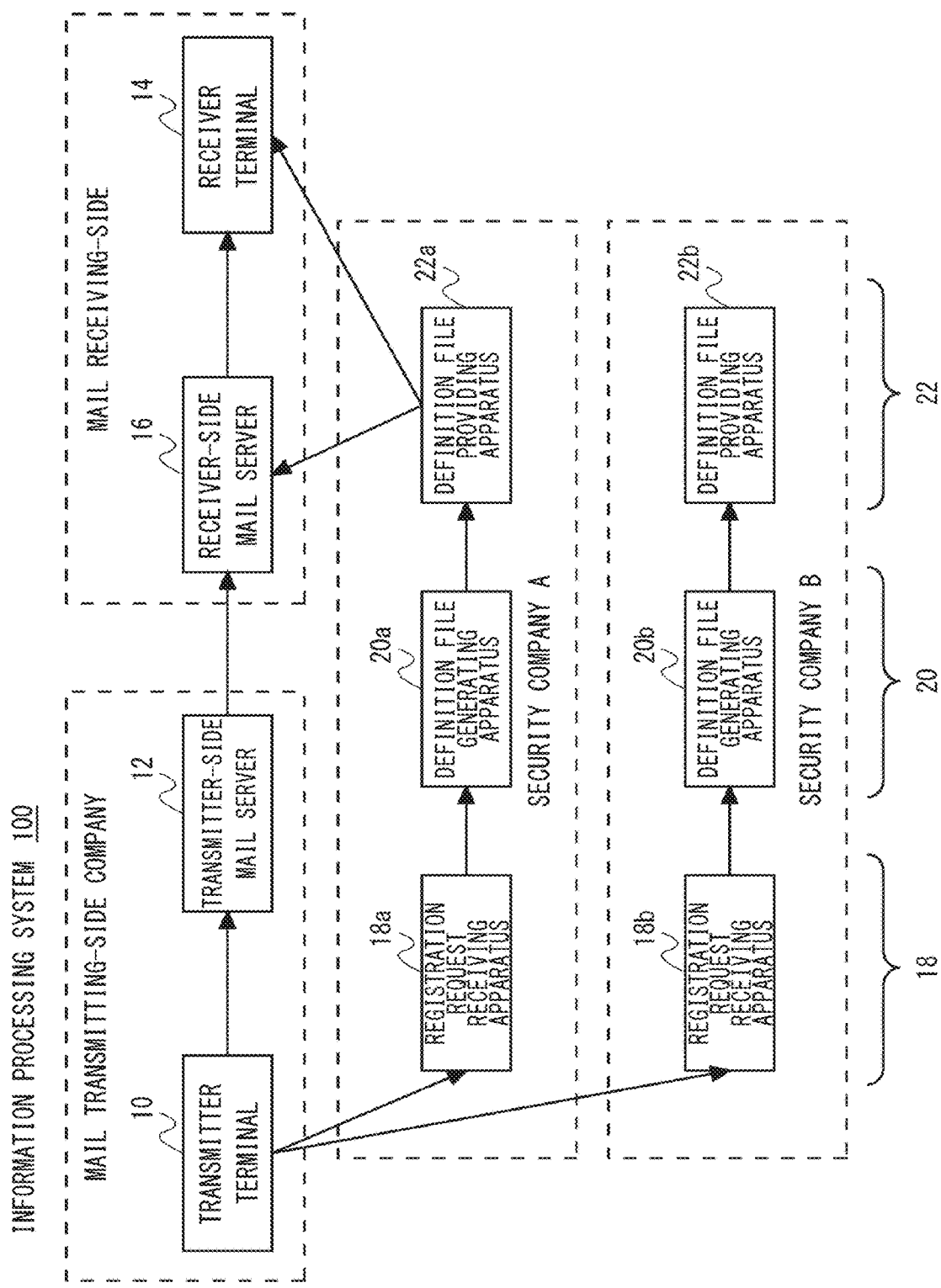
FIG. 1 is a diagram illustrating the configuration of an information processing system according to an embodiment.

The invention will now be described by reference to the preferred embodiments. Description of the preferred embodiments does not limit the scope of the present invention, but to exemplify the invention.

With regard to an information processing system according to an embodiment, a brief description will be given now before explaining the configuration thereof. Information leakage or security issues can occur due to erroneous transmission of email. Also, such erroneous transmission of email may destroy the credibility of the sender, such as a company. Although mechanisms for preventing erroneous transmission of email beforehand have been provided, the mechanisms are not considered to be sufficient in reality. Considering it is difficult to completely prevent erroneous transmission of email before the email is sent, the inventors of the present invention have come up with a mechanism for restricting access to the text of the email after its transmission.

In recent years, information security has been considered important, and the inventors of the present invention acknowledge that the introduction rate of computer antivirus software (hereinafter, referred to as "antivirus software") has reached a high level. Antivirus software has the ability to scan a storage area, such as memory or the like, and detect an electronic file (for example, the electronic data of email that has been received) having features registered in a virus definition file (in other words, signature code) as typical operations thereof. The antivirus software may identify a detected electronic file as a computer virus (or as data that contains a computer virus) and may perform a removal process that has been predetermined by the antivirus software. For example, the electronic file that has been detected as a computer virus may be deleted; in other words, the data of the electronic file is erased from memory. Alternatively, the electronic file is isolated in a preset safe memory area.

In light of the state of diffusion of such antivirus software and functions thereof, the inventors of the present invention consider that, by registering an erroneously-transmitted email as a computer virus in a virus definition file, the erroneously-transmitted email can be removed by antivirus software. In other words, the inventors consider that access to the content of erroneously-transmitted email at a destination terminal may be restricted afterward by using the existing functions of antivirus software.

In the embodiment, an erroneously-transmitted email is considered email that has been transmitted by a user by mistake, email that is deemed by the user to have erroneous information and should therefore not be sent, etc. For example, an erroneously-transmitted email includes in its header an assignment with the wrong destination address, email with text containing content that should not be transmitted, or email attached with an electronic file that should not be attached. In other words, an erroneously-transmitted email is email that was not intended for access by the receiver by the user who transmitted the email.

FIG. 1 illustrates the configuration of an information processing system 100 according to the embodiment. The information processing system 100 includes email distribution system and email viewing restriction system (not shown). A transmitter terminal 10 (otherwise known as a host), a transmitter-side mail server 12, a receiver terminal 14 (otherwise known as a receiver), and a receiver-side mail server 16 constitute the email distribution system. The transmitter terminal 10, a registration request receiving apparatus 18 (a general term for a registration request receiving apparatus 18a and a registration request receiving apparatus 18b), a definition file generating apparatus 20 (a general term for a definition file generating apparatus 20a and a definition file generating apparatus 20b), and a definition file providing apparatus 22 (a general term for a definition file providing apparatus 22a and a definition file providing apparatus 22b) constitute the email viewing restriction system.

The email distribution system delivers email transmitted from the transmitter terminal 10 to the receiver terminal 14. The email viewing restriction system analyzes email delivered from the transmitter terminal 10 to the receiver terminal 14 by the email distribution system and restricts access to the email to a user of the receiver terminal 14.

The registration request receiving apparatus 18a, the definition file generating apparatus 20a, and the definition file providing apparatus 22a are information processing apparatuses that are installed (managed) in a security company A. The registration request receiving apparatus 18b, the definition file generating apparatus 20b, and the definition file providing apparatus 22b are information processing apparatuses that are installed (managed) in a security company B. The above general terms are used for the purpose of distinguishing the roles of the apparatuses. The apparatuses shown in FIG. 1 are connected to one another via a communication network including LAN, WAN, or the Internet.

The transmitter terminal 10 and the transmitter-side mail server 12 are information processing apparatuses that are installed in a transmitting-side company of the email. The transmitter terminal 10 may be a variety of devices operated by a user, for example, a PC, a smart phone, a tablet terminal, or a mobile phone. A transmission program that may transmit email is installed in the transmitter terminal 10, and the transmitter terminal 10 functions as a mail client or mail user agent (MUA). The transmitter-side mail server 12 functions as a mail relay or mail/message transfer agent (MTA). For example, in accordance with SMTP, the transmitter-side mail server 12 receives email transmitted from the transmitter terminal 10 and forwards the email to the mail relay of a destination address.

The receiver terminal 14 and the receiver-side mail server 16 are information processing apparatuses that are installed in a receiving-side company of the email. The receiver terminal 14 may be a terminal of a variety of devices, operated by a user, and specified by the destination address of the email (i.e., a receiver terminal of the email), for example, a PC, a smart phone, a tablet terminal, or a mobile phone. A mail client is installed in the receiver terminal 14, and the receiver terminal 14 operates to receive and process the email. The receiver-side mail server 16 functions as a mail relay. For example, in accordance with SMTP, the receiver-side mail server 16 receives email forwarded from the transmitter-side mail server 12. In accordance with POP3 or IMAP, the receiver-side mail server 16 transmits the email to the receiver terminal 14.

In the embodiment, antivirus software (antivirus software A described later) is assumed to be installed in the receiver terminal 14 and the receiver-side mail server 16. The receiver terminal 14 and the receiver-side mail server 16, with the aid of their antivirus software, may detect computer viruses that are already registered in a virus definition file and may remove said computer viruses. The receiver terminal 14 and the receiver-side mail server 16 periodically download the latest virus definition file from the definition file providing apparatus 22a, described later, and update the virus definition file to the latest version in the terminal's local environment.

Security company A is a company that sells antivirus software A. The security company A generates a virus definition file for the antivirus software A and provides the virus definition file to their customers (a mail-receiving-side company in the example shown in FIG. 1). In the same way, security company B is a company that sells antivirus software B, and the security company B generates a virus definition file for the antivirus software B and provides the virus definition file to their customers (not shown in FIG. 1).

The registration request receiving apparatus 18 receives a request from the transmitter terminal 10 for registering feature information of email for a virus definition file. The details will be described later. The definition file generating apparatus 20 generates a virus definition file to be incorporated in antivirus software of its company. The definition file providing apparatus 22 provides the virus definition file generated by the definition file generating apparatus 20 according to a request by its customer's information processing apparatus (for example, the receiver terminal 14 or the receiver-side mail server 16). The function of the definition file generating apparatus 20 and the function of the definition file providing apparatus 22 may be pre-existing functions of each respective apparatus.

There is no limit to the physical number of apparatuses that are installed in each security company. For example, a plurality of data processes performed by each of the registration request receiving apparatus 18, the definition file generating apparatus 20, and the definition file providing apparatus 22 in the embodiment may be all performed by a single apparatus (housing). Alternatively, four or more apparatuses may perform the data processes in cooperation.

Figure 2:
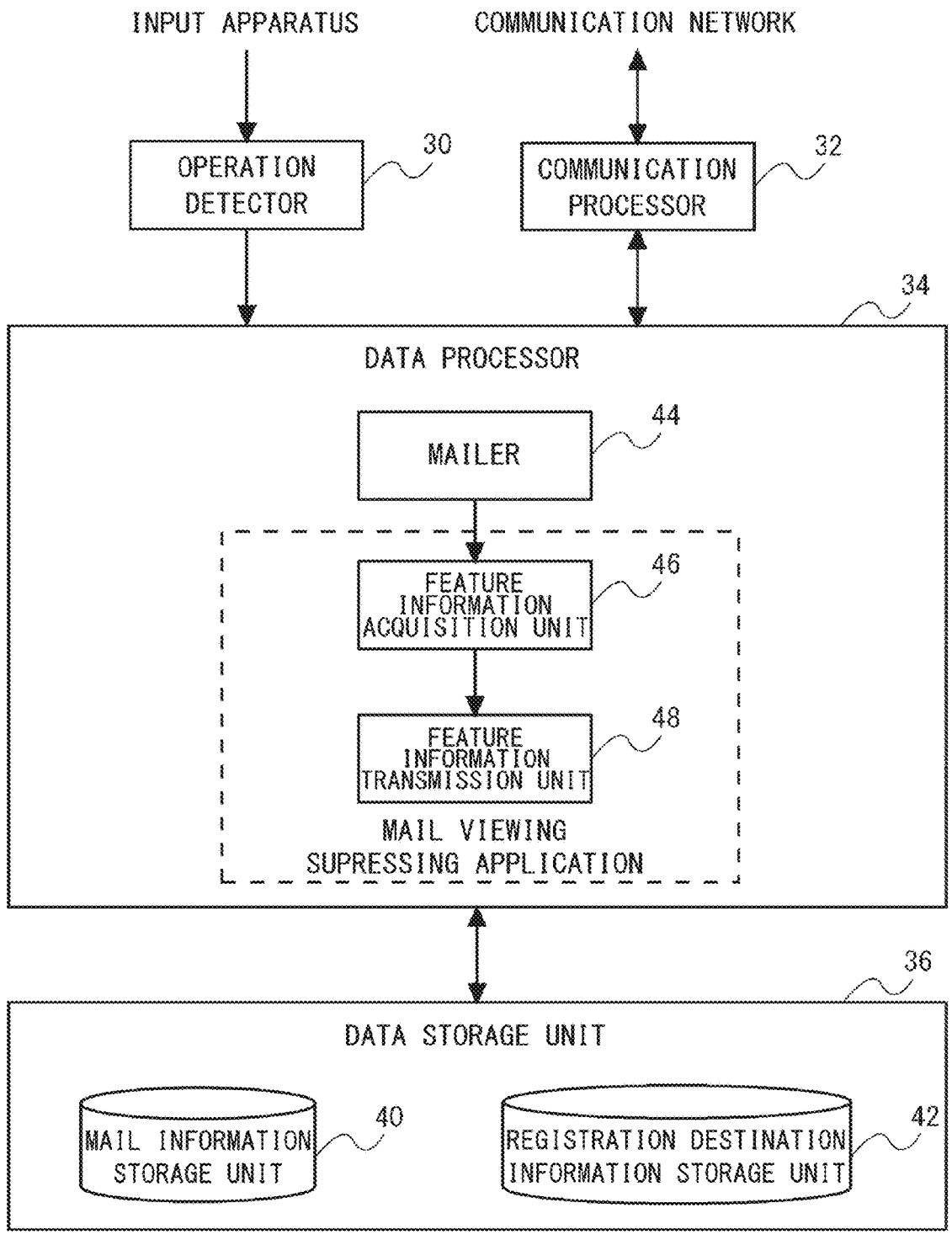
FIG. 2 is a block diagram illustrating the functional configuration of a transmitter terminal shown in FIG. 1.

FIG. 2 is a block diagram illustrating a functional configuration of the transmitter terminal 10 shown in FIG. 1, also known herein as a transmission terminal 10 or sending terminal 10. The transmitter terminal 10 is provided with an operation detector 30, a communication processor 32, a data processor 34, and a data storage unit 36. The transmitter terminal 10 is also referred to as "transmitter" in the following description.

The communication network connects terminals together directly or indirectly via an electronic circuit. Information is sent over the communication network by packets of electronic data. The communication processor 32, which is a dedicated processor for sending and receiving network information, communicates with an external apparatus over the communication network in accordance with a predetermined communication protocol (for example, SMTP, POP3, HTTP, FTP, etc.). The communication processor 32 then electronically transfers data shared with the external apparatus to a data processor 34. The data processor 34 is a processor of a transmitter terminal 10 that performs various types of information processes for the functions of the mail client. It processes input given by an input apparatus detected by an operation detector. The operation detector 30 detects operation input from the user via an input apparatus such as a keyboard, a mouse, or the like; the operation may be related to the control of the transmission and receipt of email. The data processor 34 also communicates with a data storage unit 36. The data storage unit 36 is a memory area for storing data necessary for the information processes performed by the data processor 34. The data storage unit 36 contains, in part, sectors of memory that are application-specific.

The blocks shown in the block diagram of the specification are implemented in the hardware by any CPU or memory of a computer, other elements, or mechanical devices, with software, such as a computer program, loaded on said hardware. The figure depicts functional blocks implemented by hardware with the aid of software. Thus, a person skilled in the art should appreciate that there are many ways of accomplishing these functional blocks in various forms in accordance with the components of hardware with or without the combination of software.

For example, program modules that correspond respectively to respective functional blocks in the data processor 34 may be stored in the transmitter terminal 10. A CPU of the transmitter terminal 10 may read these program modules to a sector of main memory and execute the program modules as needed, and the functions of the respective functional blocks in the data processor 34 may be thereby achieved. The data storage unit 36 may be realized by the storing of data by a memory device such as storage, main memory, etc. The same applies to other block diagrams.

The data storage unit 36 includes a mail information storage unit 40 and a registration destination information storage unit 42. The mail information storage unit 40 stores in a general sector of memory devoted to and managed by an installed mail client (mailer 44 described later), the data of email, for example, the data of email exchanged by a user of the transmitter terminal 10. The mail information storage unit 40 stores header information of an email and text information of the email as email data. The header information includes a message ID (Message-ID), a transmitter mail address (From), a receiver mail address (To, Cc, or Bcc), a subject (Subject), a transmission date (Date), etc.

For an email to be restricted from viewing-access, the registration destination information storage unit 42 of the data storage unit 36 stores information indicating the registration destination of feature information of the email. In the embodiment, the registration destination information storage unit 42 stores respective identification information pieces of the registration request receiving apparatus 18a and the registration request receiving apparatus 18b on a network and stores, for example, an IP address and a host name.

The data processor 34 includes a mailer 44 (otherwise known as a mail client 44), a feature information acquisition unit 46, and a feature information transmission unit 48. The mail client is stored in memory of the transmitter terminal 10. The mail client 44 provides the client function of receiving email. For example, the mailer 44 displays a user interface (i.e., a mailer screen) on a display device (not shown) of a transmitter terminal 10 for a user to read and write email and facilitates the exchange of email with a mail server according to an operation by the user.

The feature information acquisition unit 46 is programmed to direct the data processor 34 to acquire, from the sector of memory of mail information storage unit 40, and from among emails that have already been transmitted by the mailer 44, feature information of a specific email specified in transmission as email to be restricted from access by a destination user (hereinafter, also referred to as "access-restricted mail"). For example, the feature information acquisition unit 46 may be programmed to direct the processor to send electronic signals to a display for an input screen for feature information of access-restricted mail on a display and to acquire feature information of access-restricted mail that is entered on the input screen by a user.

Feature information of an access-restricted mail is information for distinguishing the access-restricted mail from other email and, in other words, is information that allows the access-restricted mail to be uniquely identified from among other email that exists all over the network. It is assumed that feature information in the embodiment contains at least a message-ID that is assigned to email by a mail server. A message-ID has, for example, the following format: a time and date stamp with the host's (transmitter's) domain name.

The mailer 44 may cause the data processor 34 to display on a connected display apparatus (not shown) a sent screen with a sent tray, with header information of an already-transmitted mail that is to be access-restricted by a destination user. Then, the data processor 34 of the host may transcribe the message-ID displayed with the header information of an email to an input screen as feature information of access-restricted mail.

As long as feature information represents information that allows a specific email to be identified from among many emails, the feature information is not limited to the message-ID of an email. As an example, feature information may be an optional combination of a plurality of items (for example, From, To, Subject, Date, etc.) contained in the header information of the email. A portion of the text data of the email may be further combined.

The feature information transmission unit 48 is programmed such that the data processor 34 transmits an electronic message via the communication processor 32 to a virus definition file source. The electronic message requests the registration of feature information of an access-restricted mail in a virus definition file as feature information of a computer virus (hereinafter, referred to as "feature registration request"). In the embodiment, the feature information transmission unit 48 causes the data processor 34 to transmit the electronic message to the terminal of the source of the virus definition file stored in the registration destination information storage unit 42; more specifically, an electronic message is broadcast via the network to both the registration request receiving apparatus 18a and the registration request receiving apparatus 18b at once. This allows the feature information of the access-restricted mail to be registered in each of the respective virus definition files of the antivirus software A and the antivirus software B.

The feature information transmission unit 48 adds a digital signature, which proves the identity of the transmitter; in other words, an electronic signature for the verification of the identity of the transmitter is sent with the feature registration request. For example, the feature information transmission unit 48 may transmit, to the registration request receiving apparatus 18, a feature registration request that contains the feature information of the access-restricted mail, data obtained by encrypting a message digest of the feature information by a secret key of the transmitter, and a transmitter ID that is assigned in advance to the host user by the security company. As described later, the registration request receiving apparatus 18 determines, based on the digital signature, whether or not the sender of the feature registration request is a user who has legitimate authority to deny access to a transmission. The registration request receiving apparatus 18 then permits an update of the virus definition file based on the feature registration request under the condition that the sender is a user who has said legitimate authority.

The feature information acquisition unit 46 and the feature information transmission unit 48 may be installed in the transmitter terminal 10 within its main memory as mail-viewing restriction applications or may be incorporated in the mailer 44 as add-on programs therein. In this case, the transmitter may select as an access-restricted mail a specific email from a list of already-transmitted emails that are displayed on the Sent tray screen of the transmitter terminal 10 according to the user interface of the mailer 44. The feature information acquisition unit 46 may receive, within the processor, direction from the mailer 44 indicating that an access-restricted email has been selected, and the data processor 34 acquires, upon instruction by the feature information acquisition unit 46, the message ID of the access-restricted mail from the mail information storage unit 40 by making a memory access request.

Figure 3:
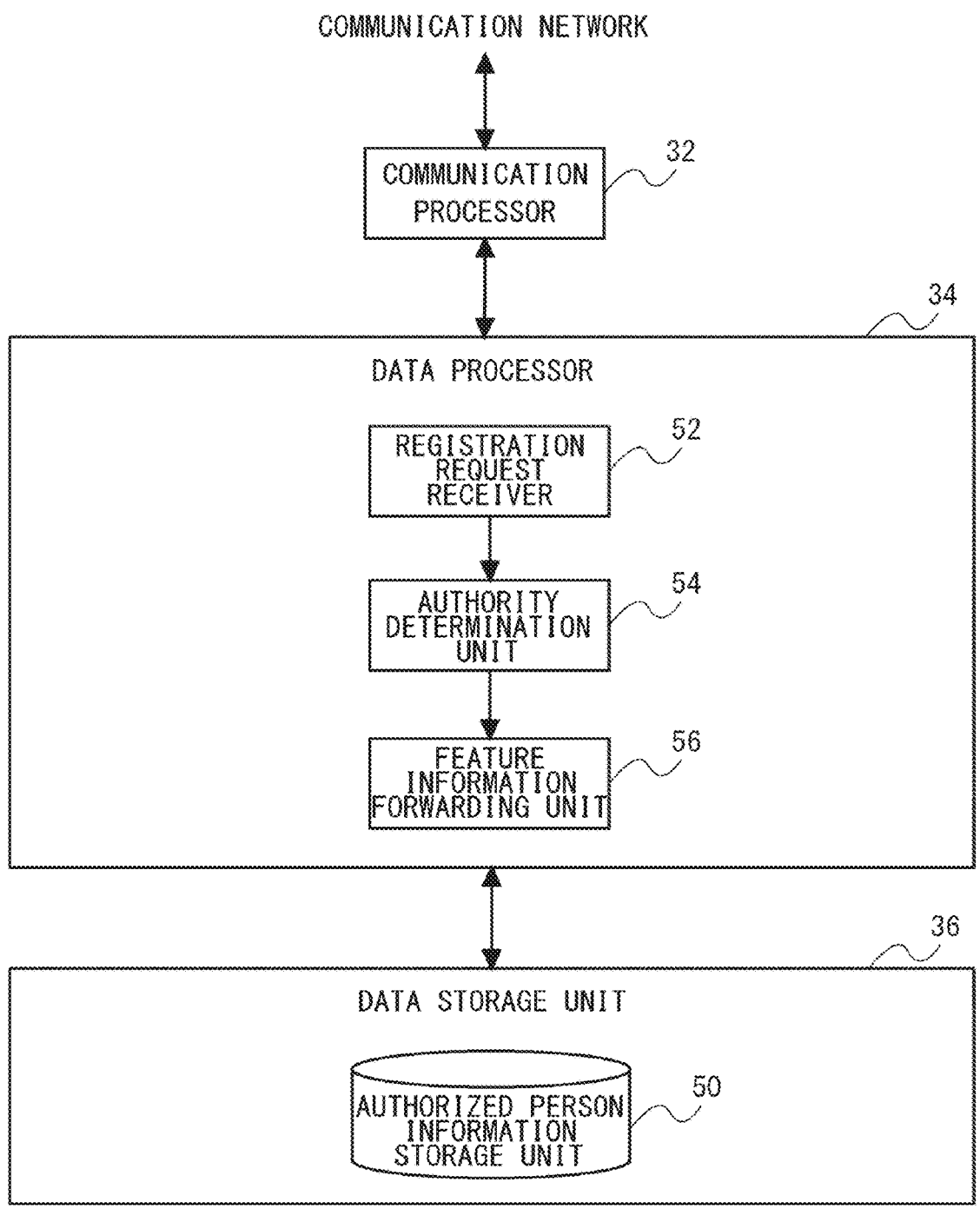
FIG. 3 is a block diagram illustrating the functional configuration of a registration request receiving apparatus shown in FIG. 1.

FIG. 3 is a block diagram illustrating a functional configuration of the registration request receiving apparatus 18 shown in FIG. 1. In functional blocks shown in FIG. 3, like numerals represent like functional blocks, which are identical to or correspond to functional blocks already explained in FIG. 2, and thus previous descriptions are omitted. The registration request receiving apparatus 18 includes an authorized person information storage unit 50, a registration request receiver 52, an authority determination unit 54, and a feature information forwarding unit 56, which function within a dedicated processor, programmed to operate with instructions respective to the aforementioned units.

The authorized person information storage unit 50 stores the information of a user who is permitted beforehand to register feature information of email (i.e., an access-restricted mail), in other words, a user who has legitimate right and authority to register the feature information of the email (hereinafter, referred to as an "authorized person"). The authorized person information storage unit 50 may store various types of identification information or attribute information related to an authorized person, the information used for distinguishing the authorized person from another user. In the embodiment, the authorized person information storage unit 50 is a dedicated memory that stores a combination of an ID assigned to an authorized person in advance by a security company (the above-stated transmitter ID), the name of an organization to which the authorized person belongs, the name of the authorized person, identification information (IP address, domain name, etc.) of a terminal of the authorized person that is registered with the security company in advance by the authorized person, a public key of the authorized person, etc.

The registration request receiver 52 acquires, via the communication processor 32, a feature registration request transmitted from the transmitter terminal 10 over a network. That is, the registration request receiver 52 forms a circuit connection to the transmitter terminal 10 through the network. The authority determination unit 54 allows a processor to determine whether or not the transmitter of the feature registration request is a legitimate authorized person based on a digital signature added to the feature registration request acquired by the registration request receiver 52.

For example, the processor of the authority determination unit 54 may acquire information of a public key of the transmitter that is associated with a transmitter ID included in the feature registration request from the authorized person information storage unit 50. The authority determination unit 54 may acquire the public key from an external certification authority, obviously. The authority determination unit 54 may allow the processor to acquire an original message digest by decoding, by the public key of the transmitter, encrypted data included in the feature registration request and may separately generate a message digest of feature information of an access-restricted mail included in the feature registration request. The authority determination unit 54 allows a processor to compare these message digests and determine that the transmitter of the feature registration request is a legitimate authorized person when the message digests match each other.

When the transmitter of the feature registration request is determined to be a legitimate authorized person by the authority determination unit 54, the feature information forwarding unit 56 allows the communication processor 32 to forward the feature information of the access-restricted mail included in the feature registration request to the definition file generating apparatus 20.

Figure 4:
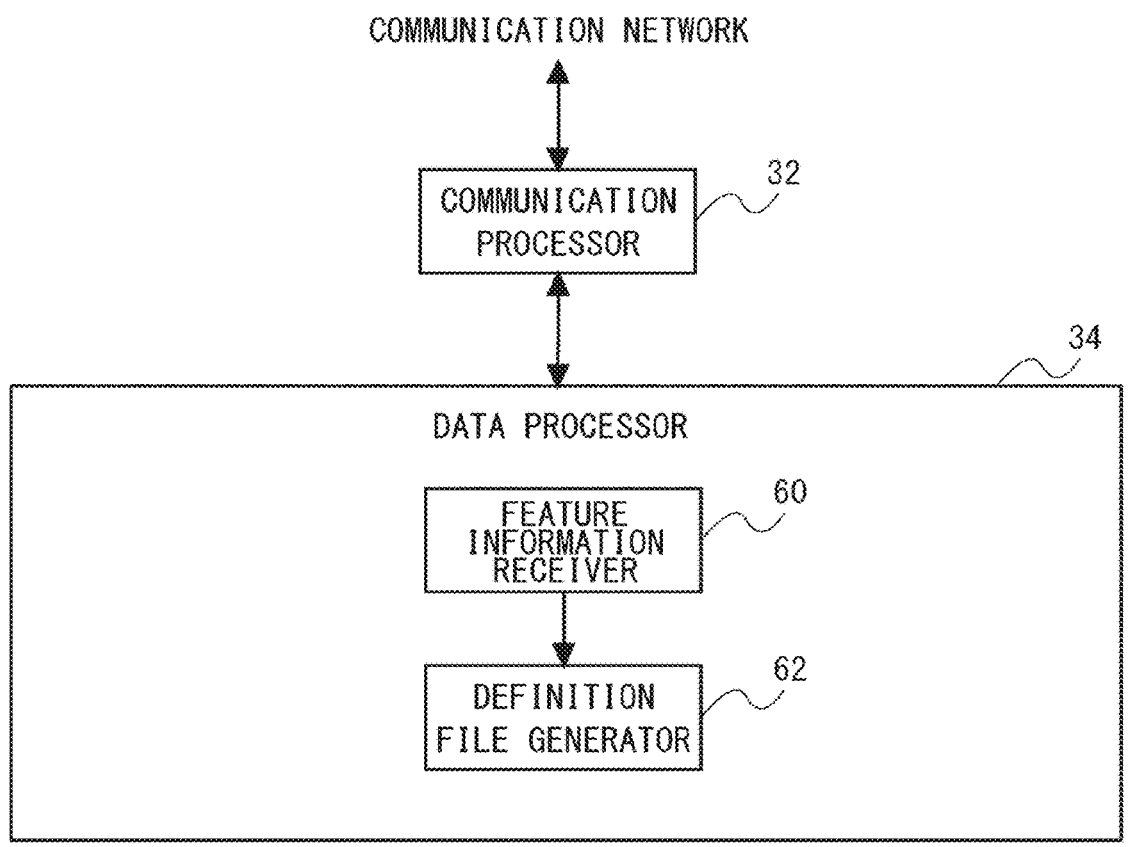
FIG. 4 is a block diagram illustrating the functional configuration of a definition file generating apparatus shown in FIG. 1.

FIG. 4 is a block diagram illustrating a functional configuration of the definition file generating apparatus 20 shown in FIG. 1. In functional blocks shown in FIG. 4, like numerals represent like functional blocks that are identical to or correspond to functional blocks already explained in FIG. 2, and the descriptions thereof that are described previously are omitted. The definition file generating apparatus 20 includes a feature information receiver 60 and a definition file generator 62.

The feature information receiver 60 allows the communication processor 32 to acquire, via the communication processor 32, the feature information of the access-restricted mail forwarded from the registration request receiving apparatus 18. The definition file generator 62 records, as a signature code of a computer virus, the feature information of the access-restricted mail acquired by the feature information receiver 60 in a virus definition file for antivirus software of the own company. In other words, the definition file generator 62 adds the feature information of the access-restricted mail to a virus definition file generated thus far so as to register the feature information in the virus definition file. The definition file generator 62 stores in a predetermined memory device the latest virus definition file in which the feature information of the access-restricted mail has been added.

An explanation will be given of the operation of the information processing system 100 having the above-stated structure with reference to FIG. 1. Among emails that have already been transmitted, the transmitter specifies, as an access-restricted mail, email for which suppressed viewing is desired for a receiver specified by the destination (To, Cc, or Bcc). The transmitter terminal 10 acquires the feature information of the access-restricted mail, and the feature information transmission unit 48 allows a processor to transmit a feature registration request containing the feature information of the access-restricted mail and a digital signature of the transmitter to the terminal of the source of the virus definition file via a network. In the embodiment, the feature information transmission unit 48 allows the processor to transmit the feature registration request to a plurality of source apparatuses (i.e., the registration request receiving apparatus 18a and the registration request receiving apparatus 18b) in order to register the feature information of the access-restricted mail in a plurality of types of virus definition files for a plurality of types of antivirus software stored in memory.

The authority determination unit 54 of the registration request receiving apparatus 18 determines whether or not the transmitter of the feature registration request is a legitimate authorized person based on the digital signature of the transmitter in the feature registration request. Then, when the transmitter of the feature registration request is determined to be a legitimate authorized person, the authority determination unit 54 allows the processor to notify the definition file generating apparatus 20 of the feature information of the access-restricted mail indicated by the feature registration request. The definition file generator 62 of the definition file generating apparatus 20 adds, as a signature code for detecting a computer virus, the feature information of the access-restricted mail to the virus definition file. The definition file providing apparatus 22 transmits the latest-version virus definition file generated by the definition file generating apparatus 20 to a client terminal according to a provision request from the client terminal. For example, the receiver terminal 14 and the receiver-side mail server 16 are client terminals in the definition file providing apparatus 22a.

The receiver terminal 14 and the receiver-side mail server 16 access the definition file providing apparatus 22a on a periodic basis in accordance with periodic preset definition updates and download the latest-version virus definition file for antivirus software A. Then, the receiver terminal 14 and the receiver-side mail server 16 incorporate the latest-version virus definition file in antivirus software A in a local environment of a terminal that implements the antivirus software. Afterwards, antivirus software A, which has been installed in each of the receiver terminal 14 and the receiver-side email server 16, allows a terminal processor to detect the access-restricted mail as a computer virus by a real-time scan or periodic scan of the memory system of the computer and allows the terminal processor to perform removal of the access-restricted mail. For example, the antivirus software A deletes the data of the viewing-restricted mail from the memory storage dedicated to the mail client.

From the information processing system 100 according to the embodiment, an erroneously-transmitted email is registered in a virus definition file as a computer virus. In other words, the features of an erroneously-transmitted mail are registered in a "blacklist" by antivirus software. This allows the antivirus software to instruct the terminal processor to remove the erroneously-transmitted mail and restrict access to the erroneously-transmitted mail by a receiver after the fact.

For example, it is assumed that feature information of an erroneously-transmitted mail becomes reflected in the virus definition file while the erroneously-transmitted mail is not received by the receiver terminal 14 although the erroneously-transmitted mail has reached the receiver-side mail server 16. In this case, the erroneously-transmitted mail can be removed by the receiver-side mail server 16, and the acquisition of an access-restricted mail by the receiver terminal 14 and the viewing of the access-restricted mail by a receiver can be suppressed.

Further, for example, it is assumed that feature information of an erroneously-transmitted mail becomes reflected in the virus definition file after the erroneously-transmitted mail is acquired by the receiver terminal 14. In this case, the erroneously-transmitted mail can be also removed by the receiver-side mail server 16 and the receiver terminal 14 after the reflection, and any further viewing by a receiver of the erroneously-transmitted mail can thus be suppressed. In other words, even after an erroneously-transmitted mail is downloaded to the receiver terminal 14, there may be restricted viewing of the erroneously-transmitted mail by a receiver after the change in policy. For example, suppression of access to the content of an access-restricted mail by the receiver of the access-restricted mail can occur after the update of the virus definition file in the receiver terminal 14.

According to the information processing system 100 in the embodiment, an erroneously-transmitted mail has restricted access through using a mechanism of updating a virus definition file, detecting a virus, and removing a virus performed by existing antivirus software. Therefore, unlike the above Patent Document No. 1, it is not necessary to provide a new relay apparatus within the jurisdiction of a transmitter organization and accumulate already-transmitted email in the new relay apparatus. The embodiment allows an increase in system resources and a suppression of system costs. Also, since email delivered by a commonly-used mail distribution system can be access-restricted afterward without changing the existing mechanism of email transmission/reception, the mechanism according to the embodiment can be applied to many systems while respecting existing system protocols.

According to the information processing system 100, the feature information of an access-restricted mail is registered in a plurality of types of virus definition files for a plurality of types of antivirus software. This allows for restricted viewing rights by each receiver even when there are many different destinations (for example, a plurality of different companies that use different antivirus software) specified from an erroneously-transmitted mail. Even when an erroneously-transmitted mail is, for example, forwarded from the receiver to another person, there may be restricted viewing applied to the forwarding destination user. For example, when a message ID of an erroneously-transmitted mail is used as feature information, the erroneously-transmitted mail that has been forwarded can be removed by a mail server or user terminal of a forwarding destination in the same way as in a forwarding source, since the message ID of the erroneously-transmitted mail is contained in the header information (References) of the forwarded mail.

According to the information processing system 100, tampering and unauthorized deletion by a third person can be prevented since the registration of feature information of an access-restricted mail is only permitted when a person who has registered the feature information of the access-restricted mail is confirmed to be a preset legitimate authorized person.

Described above is an explanation of the present invention based on the embodiments. These embodiments are intended to be illustrative only, and it will be obvious to those skilled in the art that various modifications to constituting elements and processes could be developed and that such modifications are also within the scope of the present invention. Exemplary variations are shown in the following.

A first exemplary variation will be described. In the above embodiment, an example is shown where access to an erroneously-transmitted email by a receiver is restricted afterward by using a mechanism of detecting and removing a computer virus performed by a processor under instruction from antivirus software. Targets for such viewing restriction are not limited to emails. For example, electronic files in general can be subject to viewing/access restriction.

In the first exemplary variation, it is assumed that a transmitter terminal 10 transmits from itself as a source an electronic file to a receiver terminal 14 through a means such as publicly-known file forwarding services or publicly-known P2P communication. The transmitter terminal 10 is provided with a file information storage unit (corresponding to a mail information storage unit 40), which is a dedicated memory storage that stores information regarding an already-transmitted electronic file. A feature information acquisition unit 46 of the transmitter terminal 10 allows a processor to acquire, from the file information storage unit, feature information of an electronic file that has already been transmitted and that is a specific electronic file specified by a transmitter as an electronic file to be restricted from being viewed by a receiver (hereinafter, referred to as an "access-restricted file").

Feature information of an access-restricted file needs to be information that is expected to allow the access-restricted file to be uniquely identified from among many electronic files and may be at least a part of predetermined metadata or text data or a combination of a plurality of information items. For example, written as metadata, the feature information may be a file name, a file generation date, a source, transmission data, a transmission origin IP address, a transmission destination IP address, etc., or an optional combination of these. Written as text data, the feature information may be data of a predetermined byte length, from the beginning of the text.

A feature information transmission unit 48 of the transmitter terminal 10 instructs the terminal processor to transmit feature information of an access-restricted file to a registration request receiving apparatus 18*a* and a registration request receiving apparatus 18*b*. In the same way as in the embodiment, this allows the feature information of the access-restricted file to be registered in a plurality of types of virus definition files for a plurality of types of antivirus software and allows the access-restricted file to be detected as a computer virus by the plurality of types of antivirus software running on terminals. In the same way as in the embodiment, whether or not the transmitter of the feature information of the access-restricted file is a legitimate authorized person may be obviously determined based on a digital signature of the transmitter. Since the data of one email is treated as one electronic file, the first exemplary variation suggests a structure that is a superordinate concept of that, according to the embodiment.

A second exemplary variation will be described. Although not mentioned in the above embodiment, a registration request receiving apparatus 18 may have the function of a web server. In the second exemplary variation, according to a request from a transmitter terminal 10, the registration request receiving apparatus 18 transmits over a network, to the transmitter terminal 10, a web page (hereinafter, referred to as "feature registration web page") for allowing feature information of an access-restricted mail to be entered by a transmitter. The transmitter terminal 10 displays a feature registration web page on a display.

The transmitter enters the feature information of the access-restricted mail on a feature registration web page provided by each security company and uploads the feature information to the registration request receiving apparatus 18. Each of a registration request receiving apparatus 18*a* and a registration request receiving apparatus 18*b* acquires the feature information of the access-restricted mail entered on a feature registration web page of their own company. Hereinafter, apparatuses in each security company operates in the same way as in the embodiment. Whether or not a transmitter is a legitimate authorized person may be obviously checked using a transmitter ID and a password that are assigned to the transmitter in advance. In the second exemplary variation, an apparatus of a security company, for example, a registration request receiving apparatus 18 may be provided with a feature information acquisition unit described in the claims.

A third exemplary variation will be described. In the above embodiment, a transmitter who has erroneously transmitted email registers, at a security company, feature information of the erroneously-transmitted mail. As an exemplary variation, an authorized person in charge of registration (for example, a superior, a system administrator, etc.) preassigned in an organization to which the transmitter belongs may receive a report at the authorized person's terminal from the user source of the transmission and may register feature information of an erroneously-transmitted mail at a plurality of security companies. In this case, the terminal of the authorized person in the organization to which the user source of the transmission belongs may operate in tandem with the feature information acquisition unit 46 and the feature information transmission unit 48 to allow a processor to perform the aforementioned functionalities. An authorized person information storage unit 50 of a registration request receiving apparatus 18 may store information of the authorized person in the transmitter-side organization, and an authority determination unit 54 of the registration request receiving apparatus 18 may allow the terminal processor to determine whether or not the transmitter of feature information of an access-restricted mail is a preset legitimate authorized person.

A fourth exemplary variation will be described. In the above embodiment, the mechanism of a digital signature is used for authenticating whether or not a user on the transmitting device of a feature registration request is a legitimate authorized person. As an exemplary variation, authentication using a domain name instead of authentication by or along with a digital signature may be performed. For example, when receiving a feature registration request from a transmitter terminal 10 (or a terminal of an authorized person of an organization as shown in the third exemplary variation), reverse DNS (domain name server) lookup may be performed using a transmission origin IP address shown by the request, and the acquisition of the domain name of the transmission origin of the request may be achieved. An authority determination unit 54 allows a processor to determine whether a transmitter of the feature registration request is a legitimate authorized person when the domain name of the transmission origin of the request matches a domain name related to an access-restricted mail, for example, a domain name shown by the email address of the transmission origin of an access-restricted mail or a domain name shown by a message ID of the access-restricted mail. According to this exemplary variation, unauthorized deletion operations can be more surely eliminated.

A fifth exemplary variation will be described. A transmitter terminal 10 may be further provided with a correspondence relationship storage unit, as a memory that stores a correspondence relationship between a destination address of an email and the type of antivirus software implemented by a user at a destination thereof. More specifically, by the inclusion of a table storing the correspondence relationship in a mail-restricted-access application shown in FIG. 2, the correspondence relationship storage unit may be incorporated in the transmitter terminal 10 in which the mail-restricted-access application is installed. For example, the correspondence relationship storage unit may store a correspondence relationship between a domain name (for example, a company domain) included in a transmission origin address of an email and an address (IP address or the like) of an apparatus (for example, a registration request receiving apparatus 18) of a security company that provides a virus definition file for antivirus software implemented by an organization (company) to which a user at the destination belongs.

When an access-restricted mail is selected in the transmitter terminal 10, a feature information transmission unit 48 of the transmitter terminal 10 may specify, by referring to the correspondence relationship storage unit, a transmission destination of a feature registration request that is associated with the domain name of a destination address of the access-restricted mail. When a feature information acquisition unit 46 acquires feature information of the access-restricted mail, the feature information transmission unit 48 may transmit a feature registration request containing the feature information only to an apparatus of the transmission destination specified by referring to the correspondence relationship storage unit. When email is to be detected as a computer virus, it is expected that there is a risk where the credibility of the transmission origin of the email is lost. However, according to the fifth exemplary variation, a virus definition file for registering feature information of an access-restricted mail can be limited, and the risk for damage to the credibility of a company or an individual can thus be reduced.

A sixth exemplary variation will be described. In the above embodiment, being triggered by a periodic request from a client terminal, the latest-version virus definition file in which feature information of an access-restricted mail is reflected is distributed by a definition file providing apparatus 22. As an exemplary variation, when a definition file generating apparatus 20 updates an existing virus definition file so as to reflect feature information of an access-restricted mail in the virus definition file, a definition file providing apparatus 22 may actively (i.e., voluntarily) transmit, to a client terminal the latest-version virus definition file in which the feature information of the access-restricted mail is reflected, regardless of the presence of a request from the client terminal (for example, a receiver terminal 14 and a receiver-side mail server 16). For example, according to a publicly-known push delivery mechanism, the latest-version virus definition file may be transmitted to the client terminal and may be incorporated in antivirus software of the client terminal.

According to this exemplary variation, a virus definition file in which feature information of an access-restricted mail is reflected can be distributed to a user in a relatively short time after the feature information of the access-restricted mail is registered, in other words, after a transmitter specifies the viewing restriction of a specific, already-transmitted mail. This allows the removal of the access-restricted mail by the antivirus software to be achieved in a short time so that the suppression of the viewing by a receiver of the access-restricted mail can be further surely and easily achieved. For example, the detection and removal of the access-restricted mail can be more easily performed by a receiver-side mail server 16 before the access-restricted mail is acquired by a receiver terminal 14.

A seventh exemplary variation will be described. In the above embodiment, a definition file generating apparatus 20 automatically reflects feature information of an access-restricted mail in a virus definition file. As an exemplary variation, feature information of an access-restricted mail may be registered in a virus definition file through a manual operation of a developer of a security company.

Optional combinations of the aforementioned embodiment and exemplary variations will also be within the scope of the present invention. New modes of practicing the invention created by combinations will provide the advantages of the embodiment and variations combined. Therefore, it will be obvious to those skilled in the art that the function to be achieved by each constituent requirement described in the claims may be achieved by each constituting element shown in the embodiments and in the modifications or by a combination of the constituting elements.

What is claimed is:

1. A receiving apparatus installed or managed in a security company comprising:
a processor, which is configured to:
receive, over a network, a request for registering feature information of a target electronic file, among electronic file that has already been transmitted from a transmitter terminal, wherein the transmitter terminal is a personal computer (PC), a smart phone, or a tablet terminal, wherein the target electronic file does not contain any computer virus and is specified as an electronic file to be viewing-access restricted from a receiver-side user of a receiver terminal by an operation input from a transmitter-side user of the transmitter terminal via an input apparatus of the transmitter terminal, wherein the receiver terminal is a personal computer (PC), a smart phone, or a tablet terminal; and
process and provide the feature information of the target electronic file that does not contain any computer virus to a generating apparatus or a generating unit that generates a virus definition file of an antivirus software, to register the feature information of the target electronic file, that does not contain any computer virus, in the virus definition file to detect the target electronic file that does not contain any computer virus as a removal target by the antivirus software installed on the receiver terminal and implemented by the receiver-side user of the receiver terminal,
wherein the target electronic file, that does not contain any computer virus, is removed by the antivirus software installed on the receiver terminal.

2. The receiving apparatus according to claim 1, wherein the electronic file is an email.

3. The receiving apparatus according to claim 1, wherein the feature information to be registered in the virus definition file is information that allows the target electronic file that does not contain any computer virus to be identified and distinguished from other electronic files.

4. The receiving apparatus according to claim 1, wherein the target electronic file that does not contain any computer virus is an email, and the feature information to be registered in the virus definition file is a message-identifier (ID) that is assigned to the email by a mail server.

5. A method of restricting viewing access, comprising:
receiving, over a network, a request for registering feature information of a target electronic file, among electronic file that has already been transmitted from a transmitter terminal, wherein the transmitter terminal is a personal computer (PC), a smart phone, or a tablet terminal, wherein the target electronic file does not contain any computer virus and is specified as an electronic file to be viewing-access restricted from a receiver-side user of a receiver terminal by an operation input from a transmitter-side user of the transmitter terminal via an input apparatus of the transmitter terminal, wherein the receiver terminal is a personal computer (PC), a smart phone, or a tablet terminal; and
providing the feature information of the target electronic file, that does not contain any computer virus, to a generating apparatus or a generating unit that generates a virus definition file of an antivirus software, to register the feature information of the target electronic file, that does not contain any computer virus, in the virus definition file to detect the target electronic file that does not contain any computer virus as a removal target by the antivirus software installed on the receiver terminal and implemented by the receiver-side user of the receiver terminal,
wherein the target electronic file, that does not contain any computer virus, is removed by the antivirus software installed on the receiver terminal.

6. The method of restricting viewing access according to claim 5, wherein
the electronic file is an email.

7. The method of restricting viewing access according to claim 5, wherein the feature information to be registered in the virus definition file is information that allows the target electronic file that does not contain any computer virus to be identified and distinguished from other electronic files.

8. The method of restricting viewing access according to claim 5, wherein the target electronic file that does not contain any computer virus is an email, and the feature information to be registered in the virus definition file is a message-identifier (ID) that is assigned to the email by a mail server.

9. A non-transitory computer-readable recording medium storing a computer program, the computer program causing a dedicated processor to execute:
acquiring, over a network, feature information of a target electronic file, among electronic file that has already been transmitted from a transmitter terminal, wherein the transmitter terminal is a personal computer (PC), a smart phone, or a tablet terminal, wherein the target electronic file does not contain any computer virus and is specified as an electronic file to be restricted from viewing-access by a receiver-side user of a receiver terminal by an operation input from a transmitter-side user of the transmitter terminal via an input apparatus of the transmitter terminal, wherein the receiver terminal is a personal computer (PC), a smart phone, or a tablet terminal; and
transmitting, over the network, the feature information of the target electronic file, that does not contain any computer virus, to a receiving apparatus installed or managed in a security company that receives information for identifying a removal target for an antivirus software to register the feature information of the target electronic file, that does not contain any computer virus, in a virus definition file of the antivirus software,
wherein the target electronic file that does not contain any computer virus is removed by the antivirus software installed on the receiver terminal and implemented by the receiver-side user of the receiver terminal.

10. The non-transitory computer-readable recording medium according to claim 3, wherein
the electronic file is an email.

11. The non-transitory computer-readable recording medium according to claim 9, wherein the feature information to be registered in the virus definition file is information that allows the target electronic file that does not contain any computer virus to be identified and distinguished from other electronic files.

12. The non-transitory computer-readable recording medium according to claim 9, wherein the target electronic file that does not contain any computer virus is an email, and the feature information to be registered in the virus definition file is a message-identifier (ID) that is assigned to the email by a mail server.

13. A method of viewing-access restricting a target electronic file transmitted from a transmitter terminal to a receiver terminal, the method comprising:

acquiring, from the transmitter terminal, feature information of a target electronic file that does not contain any computer virus and was previously transmitted from the transmitter terminal to the receiver terminal;

transmitting the feature information of the target electronic file that does not contain any computer virus from the transmitter terminal to a security apparatus;

adding the feature information of the target electronic file, that does not contain any computer virus, to a virus definition file of an antivirus software installed on the receiver terminal and implemented by a user of the receiver terminal;

transmitting the virus definition file including the feature information of the target electronic file that does not contain any computer virus, from the security apparatus to the receiver terminal; and deleting the target electronic file that does not contain any computer virus from the receiver terminal by executing the antivirus software installed on the receiver terminal and implemented by the user of the receiver terminal using the virus definition file, wherein the target electronic file does not contain any computer virus, but the feature information of the target electronic file is added to the virus definition file.

14. The method according to claim 13, wherein the target electronic file that does not contain any computer virus is an email.

15. The method according to claim 7, wherein the feature information added to the virus definition file is information that allows the target electronic file that does not contain any computer virus to be identified and distinguished from other electronic files.

16. The method according to claim 13, wherein the target electronic file that does not contain any computer virus is an email, and the feature information added to the virus definition file is a message-identifier (ID) that is assigned to the email by a mail server.

* * * * *